April 17, 1962 L. MARKOFF-MOGHADAM 3,030,046
ELECTRICALLY OPERATED FISHING REEL WITH BRAKE
Filed Nov. 20, 1959 2 Sheets-Sheet 2
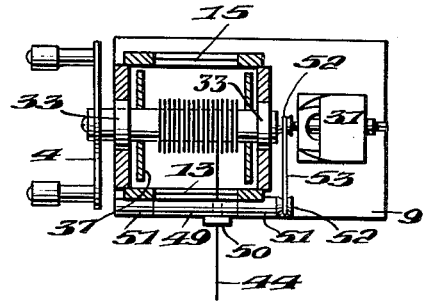
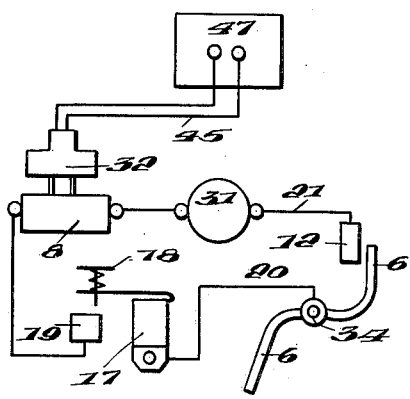
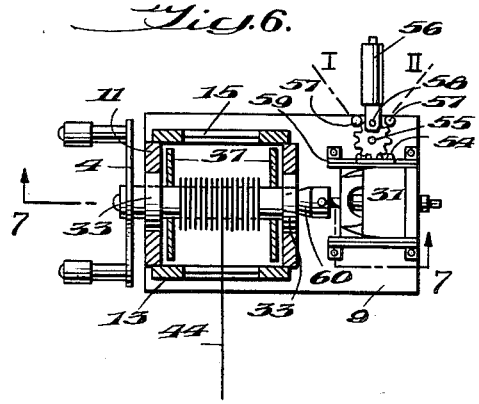
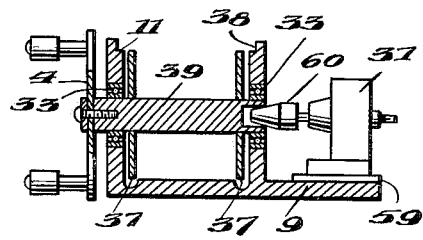
INVENTOR
L. MARKOFF-MOGHADAM,
BY *Larson and Taylor*
ATTORNEYS United States Patent Office 3,030,046
Patented Apr. 17, 1962

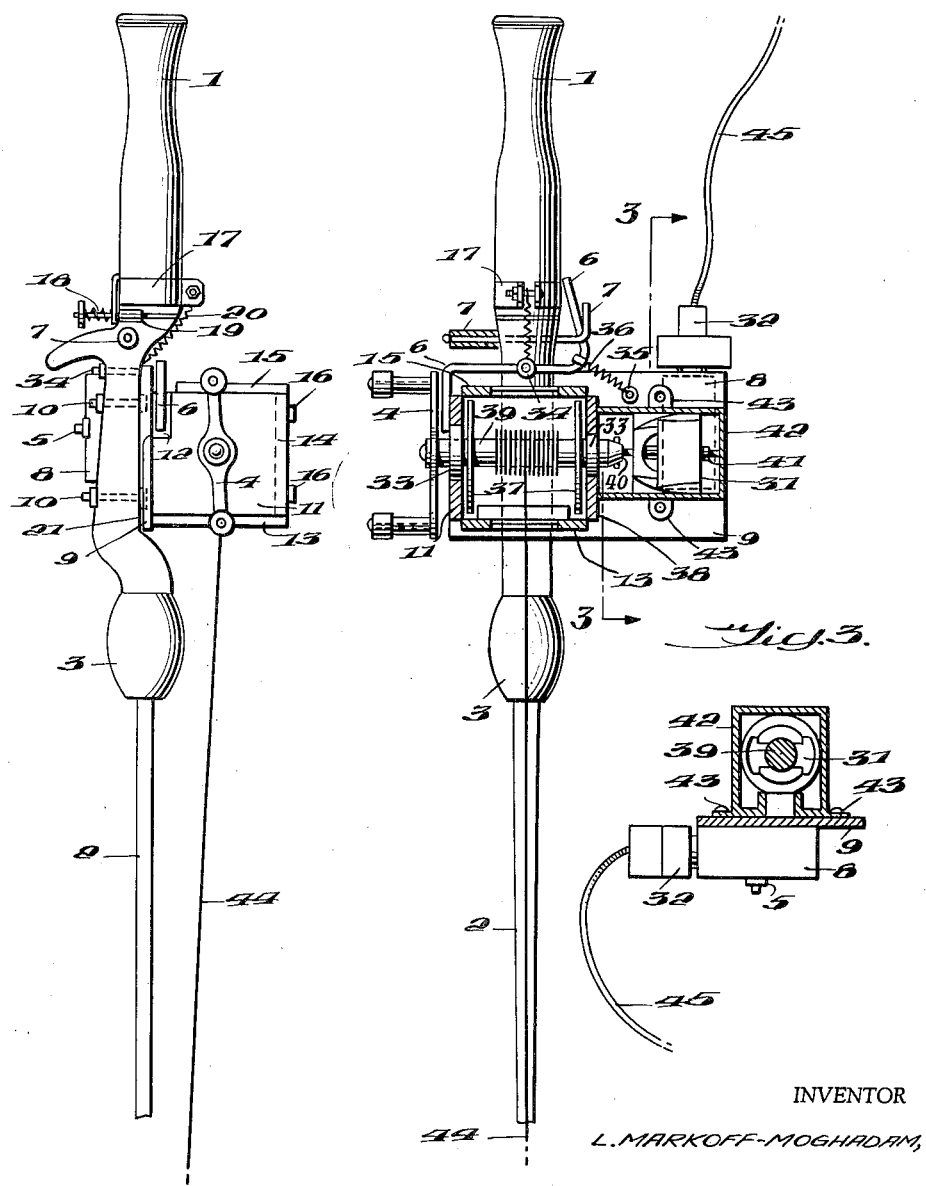

3,030,046
ELECTRICALLY OPERATED FISHING REEL
WITH BRAKE
Leo Markoff-Moghadam, 2938 Newark St. NW.,
Washington, D.C.
Filed Nov. 20, 1959, Ser. No. 854,405
1 Claim. (Cl. 242—84.53)

This invention relates to a fishing rod reel and more particularly to such a reel as may selectively be operated either electrically or by hand.

While electrically driven fishing reels have been known in the patented prior art for some fifty years, they have never proved satisfactory for a number of reasons. The objections and the manner in which the objections are overcome by the present invention will become apparent from the following.

It is an object of this invention to provide a fishing reel in which the spool is driven by a small electric motor in such manner that the motor energy is transferred to the spool through a direct coupling between the spool shaft and the motor shaft thus avoiding any losses as would occur through the use of gears or the like.

It is a further object of the invention to provide such a fishing reel in which, in addition to a switch for starting and stopping the electric motor, there is provided a special mechanical brake through which the spool may be stopped instantly through mere pressure on a lever exerted by a finger of the hand holding the reel. This mechanical brake is further designed so that before braking pressure is applied the electric current to the motor is shut off. This protects the motor from eventual shock.

Still further the invention has for an object the provision of such a reel which because of the mechanical brake which may be instantly applied does not require the use of drag or click means for preventing backlash, creeking or paying out of the fish line.

Moreover, in accordance with the invention, the fishing line is easy to cast because of the reduction to a minimum of friction in the inner system. This reduction is effected or is made possible because (1) the system employs no gears, (2) employs ball bearings, and (3) is provided with a means for selectively coupling and uncoupling the electric motor and the spool shaft. Accordingly, the spool shaft, supported by two ball bearings, is capable of completely free rotation when it is uncoupled from the motor.

Furthermore, the mechanism comprising the system is designed so as to avoid costly, high precision, and tedious manufacturing and assembling operations as would be required if the mechanism were to be disposed within the limited space of the interior of the rod's handle. The mechanism of the present invention is easily applicable to and is capable of easy attachment to and detachment from most of the standard type fishing rods now being sold on the market.

While the prior patented art of electrically driven fishing reels is some fifty years old, it is believed that these advantages represent a substantial inventive effort in the development of a practical electrically operated fishing rod.

Other objects and many of the attendant advantages of the present invention will be readily appreciated when considered in connection with the accompanying specification and drawings which are based upon a satisfactorily working model and were designed on a scale in order to avoid any structural distortions and misrepresentations.

FIG. 1 is a side elevational view of an electrically operated fishing reel constructed in accordance with the present invention.

FIG. 2 is a plan view of the invention, the cage of the fishing reel and the protective casing of the electric motor having portions cut away for the sake of lucidity.

FIG. 3 is a sectional view taken on the line 3—3 of FIG. 2.

FIG. 4 is an electrical diagram of the motor circuit.

FIG. 5 is the plan view of the fishing reel provided with the traveling fishing line guide, the top of the cage of the fishing reel being cut away for the sake of lucidity.

FIG. 6 is the plan view of the fishing reel provided with special means for selectively coupling and uncoupling the electric motor and the reel.

FIG. 7 is the sectional view of FIG. 6 along its longitudinal axis and taken along the line 7—7 of FIG. 6.

Referring now specifically to FIG. 1, there is shown at 1 the handle to which the shank 2 of a normal fishing rod is secured through the socket 3.

A main plate 9 is attached to the handle 1 by means of two bolts 10. It is preferably made out of plastic matter, because it is light, cheap, does not rust, and is an electric nonconductor.

To the plate 9 are rigidly attached (or integrally molded therewith) the walls 11 and 38 (preferably made out of plastic matter) through which passes the main shaft 39 as shown on FIG. 2.

To the end of the shaft 39 passing through the wall 11 and supported there by the ball bearing 33 is attached the crank 4. The opposite end of the shaft 39 goes through the wall 38 without touching it and is directly coupled by means of coupling box 40 with the shaft 41 of the electric motor covered by housing 42. The main shaft 39 is provided with two discs 37 (made out of sheet metal, plastic matter or wood) which form the spool of the fishing reel. The hubs of the discs are not shown on the drawing because of their relative unimportance.

The spool is protected by a removable cage supported by the walls 11 and 38 and consisting of three grates 13, 14 and 15 preferably made out of metal or plastic matter and attached together in the C-shape as shown on FIG. 1 and FIG. 2. For securing the protective cage to the walls 11 and 38 the two locks 16 are used. It will be noted from the above that the fishing reel can be selectively driven either by means of electric motor 31 or manually by turning the handle of the crank 4.

In order to stop the electric or manual rotation of the fishing reel spool the brake (lever) 6 is used. The lever 6 revolves around the pin hinge 34 and is shown on FIG. 2 in the "open" position, when one of its ends touches the wall 11 and leaves the pass of the crank 4 completely free for unrestrained rotation. But when the lever 6 moves sufficiently away from the wall 11 it interferes at once with the rotation of the crank 4 and stops it. This "locked position" of the lever 6 is the normal one, because the spring 35 through the pull exerted keeps it constantly biased towards the locked position. Thus, for de-blocking the rotation of the spool it is necessary to press the handle-end of the lever 6 towards the handle 1 of the fishing rod causing the opposite end of the lever 6 to move toward the wall 11. On the other hand, the guide pin 36 limits the linear movement of the lever 6 towards the root of the spring 35.

In case it becomes desirable to keep the lever 6 in constantly "open" position as shown on FIG. 2, this may be achieved by means of the lever 7 which hooks up and holds the lever 6 closely pressed to the wall 11. When the lever 6 must be returned into "locked" position, the lever 7 is unhooked and its bent portion is pushed back towards the handle 1 of the fishing rod.

In case of electric drive of the fishing reel spool, the functioning of the brake 6 is coordinated for the sake of precaution with the switching-in of the electric motor 31 in such a way that the motor cannot be switched-in as long as the lever 6 blocks the rotation of the crank 4 and the attached spool shaft and spool. This electromechanical coordination will be clear from a study of FIGS. 1, 2, and 4, the latter representing the electrical diagram of the motor circuit. The normal source of current is a dry-cell battery 47 which may be carried and kept in the "fisherman's bag" or pocket of the angler. The battery 47 is provided with the double electric wire 45 equipped with the plug 32. In order to supply the electric current to the motor 31 the plug 32 is pushed into the switch 8 attached by means of the bolt 5 to the main plate 9. From the switch 8 one electric wire branches off to the positive pole of the electric motor 31, and the other to the copper strap 19 attached to the rod's handle 1. Over the strap 19 is located the contact knob 18 provided with a spring which prevents the knob 18 from contacting the strap 19 as long as the knob is not pressed towards the strap by the finger of the angler. The contact knob 18 is soldered to the metallic collar 17 which keeps it attached to the rod's handle 1 made out of electrically nonconductive material. The metallic collar 17 is connected by means of the electric wire 20 with the metallic pin hinge 34 of the lever 6 resting on the electrically non-conductive main plate 9.

When the lever 6 is in the "open" position it remains closely pressed to the contact copper plate 12 which is secured to the wall 11 made out of electrically nonconductive material. The contact copper plate 12 is connected by means of the wire 21 with the negative pole of the electric motor 31. Thus, for closing the motor circuit it is necessary to press simultaneously the knob 18 and the lever 6, i.e., to keep the fishing reel in the "open" position, because as soon as the lever 6 moves away from the wall 11 and from the contact copper plate 12 the electric circuit is automatically disrupted. FIG. 3 representing a cross section of FIG. 2 is intended to elucidate still more the above described system of the fishing reel. It is evident that if so desired space can be easily procured on the main plate 9 (on the side of the switch 8) in order to attach there the dry-cell battery 47. However, it is believed to be preferable to keep the battery apart and not to surcharge the fishing rod proper which in spite of the electric motor attached can be made even lighter than some of modern hand driven rod and reel combinations. It must be kept in mind that, e.g., a 12 v. electric motor suitable for our purpose weighs less than 2½ ozs., but for feeding it at a full voltage three 4½ v. standard 2 x 2½ x ¾" batteries are required which weigh together at least one pound. Therefore it is also undesirable to try to locate the batteries in the handle of the fishing rod, because it would completely disfigure the rod's normal and convenient shape.

The adaptation of existing standard means in order to assure uniform distribution of the line on the fishing reel during rewinding operations might be useful. This alternative is shown in FIG. 5, where the rotary movement of the main shaft 39 of the fishing reel is transmitted through the band or wire gearing (consisting of two pulleys 52 and the band of wire 53) to the double threaded shaft 49 (assembled in a cover and supported by the two bearings 51) along which the traveling fishing line guide 50 is moving back and forth. It is evident that the speed of movement of the line guide 50 depends upon proportional relationship of the diameters of the two pulleys 52, and it can be adjusted according to the requirements.

In FIG. 6 and FIG. 7 another alternative is shown of an electrically driven fishing reel. The main shaft 39 of the fishing reel directly coupled with the electric motor 31 is supported at its both ends by two ball bearings 33. The shaft 39 and the electric motor 31 can be mechanically connected or disconnected merely by shifting to the right or left of the handle of the lever 56. The lever 56 is provided with a pawl 58 falling selectively into two notches 57 on the main plate 9 and locking the lever 56 in two particular positions I and II shown on FIG. 8 by dotted lines. The lever 56 is firmly secured to the pinion 55 meshed with the rack 54 which is rigidly attached to the wall of the electric motor 31. When the lever 56 is shifted from the position I to the position II or vice-versa the rack and pinion gear forces the electric motor 31, which is not bolted to the plate 9 but is freely located between the two guide-rails 59, to recede from or to move towards the wall 38 supporting one of the ends of the main shaft 39. This end of the shaft 39 is provided with an axial cylindrical bore, while the end of the shaft of the electric motor 31 is equipped with a frusto-conical wedge portion 60. The arrangement is such that when the lever 56 is locked in position II and the electric motor 31 has moved toward the wall 38, the frusto-conical wedge 60 will engage the edge of the bore of the shaft 39, and thus will efficiently couple the electric motor 31 with the fishing reel. When the lever 56 is locked in position I and the electric motor 31 has moved away from the wall 38, as shown on FIG. 7, the frusto-conical wedge 60 will get out of the axial bore of the shaft 39 and thus will mechanically disconnect the electric motor 31 from the fishing reel.

The general advantages of the new fishing reel and rod built in line with the invention here disclosed can be summarized as follows:

It is a fishing reel—

(1) Selectively driven by electricity or by hand;

(2) Easily and instantly electrically and mechanically controlled by mere movement of fingers of one hand holding the rod, while the other hand is left entirely free for auxiliary operations (e.g. bringing in the fish by turning the handle of the crank 4; locking or opening of the lever 7);

(3) Provided with an automatically functioning arrangement for switching off the electric current when the mechanical brake is applied to the fishing reel spool;

(4) Possessing a high degree of mechanical and electrical efficiency on account of direct coupling of the motor with the fishing reel, lack of gears, and use of ball bearings;

(5) Fully adequate for long distance bait casting on account of greatly reduced (by different means) friction in the inner system and special arrangements for instant mechanical disconnection of the electric motor from the fishing reel;

(6) Light in weight; and (7) Simple and cheap to build and mass-produce.

Obviously many modifications and variations of the present invention are possible in the light of the above teachings.

I claim:

A reel comprising a spool cage, a contact point mounted on said spool cage, a spool, a spool shaft for mounting said spool for free rotation within said cage, a hand crank secured to said spool shaft, a handle to mount said spool cage, an electric motor directly coupled to said spool shaft to acutate the same, a horizontally mounted pivotable braking arm of electrically conductive material, said braking arm being adapted to movement by operator's fingers so as to be pivotable into two positions, in one of which positions said braking arm is in the locus defined by the rotation of said hand crank upon said spool shaft and thereby obstructs the rotation of said hand crank and serves as a brake for said spool shaft and spool, and in the other of which positions said braking arm is against the side of said spool cage so as to not interfere with rotation of said hand crank, said braking arm being spring loaded to remain in the braking position, and means for selectively securing said braking arm in the non-braking position, said electric motor being in an electrical circuit with a power source, said circuit having two series wired circuit breakers, one of which is a switch having a set of contact points spring loaded to remain open and being so mounted on said handle as to be easily closed by pressure of the operator's thumb, and the other of which consists of said braking arm and said contact point mounted on said spool cage which is disposed adjacent said braking arm, whereby the operator may operate said braking arm and obstruct rotation of said hand crank without concern as to the position of said contact points of said thumb operated switch because of the resulting breaking of the circuit upon the pivoting of said braking arm away from said contact point mounted on said spool cage.

References Cited in the file of this patent

UNITED STATES PATENTS

| | | |
|---|---|---|
| 1,580,986 | Aberson | Apr. 13, 1926 |
| 2,230,940 | Ellsworth | Feb. 4, 1941 |
| 2,262,637 | Fanshier | Nov. 11, 1941 |
| 2,262,671 | Fanshier | Nov. 11, 1941 |
| 2,268,277 | Carter et al. | Dec. 30, 1941 |
| 2,541,876 | Lockwood | Feb. 13, 1951 |
| 2,630,982 | Gagas | Mar. 10, 1953 |
| 2,896,875 | Reed et al. | July 28, 1959 |